US008027703B2

(12) United States Patent
Girard et al.

(10) Patent No.: US 8,027,703 B2
(45) Date of Patent: Sep. 27, 2011

(54) MULTI-BEAM ANTENNA WITH MULTI-DEVICE CONTROL UNIT

(75) Inventors: Gregory Girard, Saint-Roch (FR); Frank Soulie, Montlivault (FR); Eric Proteau, Mosnes (FR); Anthony Pallone, Civray-de-Touraine (FR)

(73) Assignee: Amphenol Corporation, Wallingford, CT (US)

( * ) Notice: Subject to any disclaimer, the term of this patent is extended or adjusted under 35 U.S.C. 154(b) by 430 days.

(21) Appl. No.: 12/369,250

(22) Filed: Feb. 11, 2009

(65) Prior Publication Data

US 2010/0201591 A1 Aug. 12, 2010

(51) Int. Cl.
*H04M 1/00* (2006.01)

(52) U.S. Cl. .................................... 455/562.1; 455/560

(58) Field of Classification Search .................. 455/560, 455/561, 562.1
See application file for complete search history.

(56) References Cited

U.S. PATENT DOCUMENTS

| | | | | |
|---|---|---|---|---|
| 6,239,744 | B1 * | 5/2001 | Singer et al. | 342/359 |
| 6,366,237 | B1 * | 4/2002 | Charles | 342/368 |
| 6,667,714 | B1 * | 12/2003 | Solondz | 342/368 |
| 7,068,236 | B2 | 6/2006 | Pallone et al. | |
| 7,177,667 | B2 * | 2/2007 | Kim | 455/561 |
| 2007/0030208 | A1 | 2/2007 | Linehan | |

* cited by examiner

*Primary Examiner* — James H Cho
(74) *Attorney, Agent, or Firm* — Blank Rome LLP

(57) ABSTRACT

RET antenna with a modular switching unit and a multi-device control unit con figured to be inserted into and removed from a receptacle in the antenna. The multi-device control unit works together with motors and position sensors located inside the antenna to allow a single controller located in the multi-device control unit to control multiple embedded electro-mechanical actuators, such as phase shifter control motors. The multi-device control unit includes lightning protection circuits, communications circuits, a motor controller, power control circuits and a motor position sensing circuit inside a small housing. These components are shared between all motors inside the antenna through the modular switching unit, which allows a single set of components within the multi-device control unit to replace redundant components deployed in prior RET antennas.

11 Claims, 6 Drawing Sheets

MULTI-BEAM ANTENNA WITH MULTI-DEVICE CONTROL UNIT

REFERENCE TO PRIORITY APPLICATIONS

This application claims priority to commonly-owned U.S. Provisional Patent Application No. 60/027,687, which is incorporated herein by reference.

TECHNICAL FIELD

This invention relates to the field of cellular or mobile telephone base station antennas and, more particularly, relates to a remote electrical tilt (RET) base station antenna with a removable multi-device control unit that can be switched to remotely control more than one electro-mechanical actuator contained inside the antenna.

BACKGROUND OF THE INVENTION

Antennas with variable electrical tilt (VET) functionality are known in the art. These antennas, which are used in cellular networks, enable network operators to electrically tilt the elevation beam pointing direction of the antenna by manually rotating a knob or translating a shaft on the exterior of the antenna. The knob or shaft is linked to phase shifters inside the antenna that convert the mechanical rotation or translation of the shaft to phase changes in the radio frequency beam forming network inside the antenna. Changes in phase between radiating elements inside the antenna cause the beam emitted from the antenna to tilt up or down relative to mechanical boresite of the antenna. An example of a cellular base station antenna demonstrating VET technology is depicted in U.S. Pat. No. 7,068,236, which is incorporated by reference.

Beam tilt adjustment is needed in cellular networks to reduce signal propagation between sites in the network in order to minimize signal interference and to maximize network capacity. Antennas with VET functionality allow network operators to make accurate tilt adjustments at a cell site without mechanically tilting the antenna and without changing the visual appearance of the site. Antennas with VET functionality typically include some sort of tilt indicator to provide visual feedback of the antenna electrical tilt setting to a person located at the antenna to inspect the antenna or to manually make the tilt adjustment.

Remote electrical tilt (RET) antennas are also known in the art. RET antennas incorporate an electro-mechanical actuator attached to or installed inside of the antenna to rotate the knob or translate the shaft on a VET antenna. This enables the electrical tilt of the VET antenna to be controlled from a remote location, eliminating the expense of hiring a rigger to climb the tower and manually adjust the electrical tilt of the antenna beam.

This conventional configuration of RET actuators is shown in FIG. 1, in which a tri-band antenna 4 includes three self contained, separately removable RET actuators 5*a-c*, one for each operational frequency band of the antenna. Each RET actuator is a self contained electro-mechanical device with lightning protection circuits, communications circuits, a motor, motor control circuits, power control circuits and a motor position sensor contained within a single enclosure. For antennas designed to operate over multiple frequency bands, multiple, stand-alone RET actuators are attached to or inserted inside of the antenna housing. Cable assemblies are connected between the RET actuators to provide power and signaling to the multiple RET actuators for that antenna. This design approach is expensive due to the cost of the external cable assemblies and the redundant electronic components used by multiple RET actuators. In addition, removable RET actuators must be configured to physically align with and receive the phase shifter shafts for each beam of the multi-beam antenna, which requires a different removable RET actuator configuration for each antenna with a different phase shifter shaft configuration.

The locations of the phase shifter adjustment knobs or shafts on a typical multi-band RET antenna are constrained by the physical size and shape of the RET actuators and by their attachment mechanisms. The phase shifter adjustment knobs or shafts must be spaced far enough apart to allow the multiple RET actuators to be attached to the antenna without mechanical interference. The knobs or shafts must also be spaced far enough apart to provide room for the RET actuator mounting hardware and to provide access for the tools used to install the mounting hardware. As a result, the location of the phase shifter adjustment knobs or shafts on the antenna are often determined by the geometry of the RET actuators and not by the optimum phase shifter placement inside the antenna. These constraints increase the mechanical complexity of the RET antenna design and increase the development time and costs for new antenna models.

There is, therefore, a continuing need for a RET antenna that can be produced with fewer electronic parts for lower cost and that reduces mechanical constraints on the phase shifter drive shaft locations inside the antenna.

SUMMARY OF THE INVENTION

The present invention meets the need described above in a RET antenna with a multi-device control unit that is configured to be inserted into and removed from a receptacle in the antenna. The multi-device control unit works with one or more modular switching units, which are typically located inside the antenna enclosure, to control the motors and position sensors located inside the antenna to allow a single controller located in the multi-device control unit to control multiple embedded electro-mechanical actuators, such as phase shifter control motors. This enables multiple motors to share a common control system located in the multi-device control unit, which greatly reduces the number of electronic components required for a multi-beam RET antenna.

The multi-device control unit typically includes one or more lightning protection circuits, communications circuits, motor controllers, power control circuits and motor position sensing circuits inside a small housing, which is usually located inside the antenna housing at the time of manufacture. These components are shared between all motors inside the antenna through the modular switching unit, which allows a single set of components within the multi-device control unit to replace redundant components deployed in prior RET actuators. The modular switching unit monitors an internal addressing bus and closes the connections to the appropriate motor and motor position feedback sensor based on the hardware address for that motor. The modular switching unit is configured to be inserted into a receptacle in the antenna body and secured with two mounting screws Generally described, the invention may be practiced as a multi-beam RET base station antenna for a telecommunications system. The antenna includes a number of beam systems supported by a housing. Each beam system includes a number of antenna elements for directing a beam of electromagnetic energy in a propagation direction, a plurality of phase shifters operatively connected to the antenna elements for tilting the beam propagation direction, a control device operatively connected to the phase shifters for operating the phase shifters to tilt the beam propagation direction, and a gear-motor unit operatively connected to the control device for electro-mechanically driving the control device to tilt the beam propagation direction. The antenna also includes a multi-device control unit operative to selectively control the beam propagation direction of each beam system and one or more modular switching devices configured to interface between the multi-device control unit and the motors and position sensors of the antenna systems to allow a single set of control electronics of the multi-device control unit to selectively control the beam propagation direction of each beam system.

The modular switching unit is typically located inside the enclosure and the multi-device control unit is typically configured for manual insertion into and removal from a receptacle supported by the housing, which is typically open to the exterior of the antenna. The multi-device control unit typically includes a lightning protection circuit, a communications interface, an internal addressing interface, a motor control interface, a power sensing interface, and a power control circuit, which are sufficient components for the multi-device control unit. The modular switching device typically includes at least one switch, a signal routing device, and a plurality of address registers with each register associated with a beam system of the antenna, which are sufficient components for the modular switching device.

The invention may also be implemented in a method for providing a base station antenna for a telecommunications system with optional multi-beam RET control functionality. An antenna operator is provided with an antenna that includes a plurality of beam systems located within an antenna enclosure. Each beam system includes a number of antenna elements for directing a beam of electromagnetic energy in a propagation direction, a number of phase shifters operatively connected to the antenna elements for tilting the beam propagation direction, a control device operatively connected to the phase shifters for operating the phase shifters to tilt the beam propagation direction, and a gear-motor unit operatively connected to the control device for electro-mechanically driving the control device to tilt the beam propagation direction. The antenna is provisioned prior to delivery with a receptacle supported by the housing, which may be open to the exterior of the antenna. In response to a request from the antenna operator for optional multi-beam RET control functionality received after initial delivery of the antenna, the antenna operator is provided with a multi-device control unit configured for manual insertion into and removal from the receptacle. The modular switching device is operable to interface between the multi-device control unit and the motors and position sensors of the antenna systems to allow a single set of control electronics of the multi-device control unit to selectively control the beam propagation direction of each beam system.

In view of the foregoing, it will be appreciated that the present invention provides a cost effective RET antenna that includes a multi-device control unit that greatly reducing the number of electronic components required for a multi-RET system. The specific techniques and structures for implementing particular embodiments of the invention, and thereby accomplishing the advantages described above, will become apparent from the following detailed description of the embodiments and the appended drawings and claims.

DETAILED DESCRIPTION OF THE EMBODIMENTS

Figure 1:
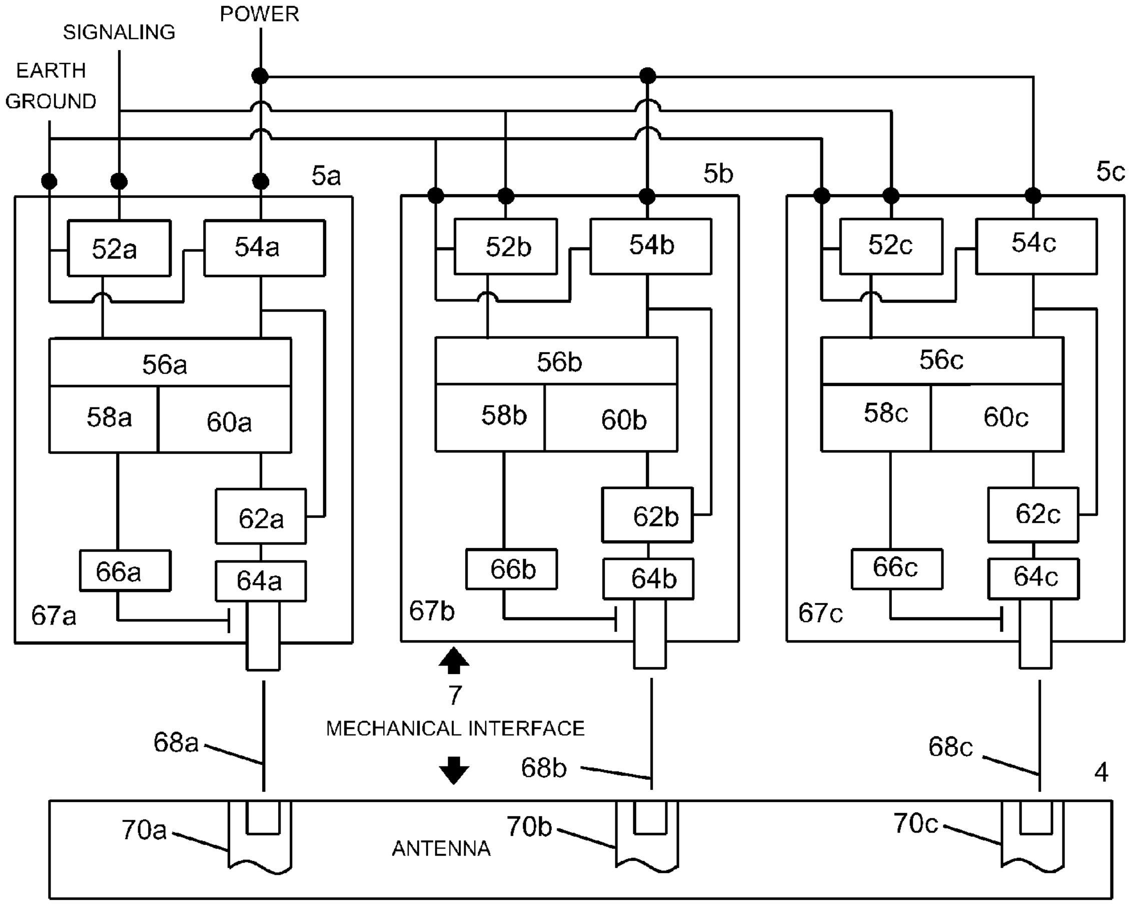
PRIOR ART FIG. 1
FIG. 1 is an electrical schematic of a prior art configuration for a tri-band antenna with three removable RET actuators.

The present invention meets the need described above in a RET antenna with a multi-device control unit that can be inserted into and removed from a receptacle in the antenna. The multi-device control unit works with one or more modular switching units, which are typically located inside the antenna enclosure. The multi-device control unit works together with motors and position sensors located inside the antenna to allow a single controller located in the multi-device control unit to control multiple embedded electro-mechanical actuators, such as phase shifter control motors. This enables multiple motors to share a common control system located in the multi-device control unit, which greatly reduces the number of electronic components required for a multi-beam RET antenna.

The multi-device control unit typically includes one or more lightning protection circuits, communications circuits, motor controllers, power control circuits and motor position sensing circuits inside a small housing that is usually located inside the antenna enclosure. These components are shared between multiple motors inside the antenna through the modular switching unit, which allows a single set of components within the multi-device control unit to replace redundant components deployed in prior RET actuators. The modular switching unit monitors an internal addressing bus and closes the connections to the appropriate motor and motor position feedback sensor based on the hardware address for that motor. This enables multiple motors to share a common control system, greatly reducing the number of electronic components required for a multi-RET system.

An electronic connector on the multi-device control unit plugs into a mating connector on a receptacle mounted to the antenna enclosure to provide power, signaling and motor position feedback between the multi-device control unit and the motors and position sensors inside the antenna. The motors and motor position feedback sensors associated with each phase shifter adjustment shaft are permanently attached inside the antenna. This configuration eliminates the mechanical drive train and linkage interface of conventional RET actuators and replaces it with an electrical interface, implemented by the multi-device control unit, between the RET controller and the antenna. The electrical connections inside the antenna are made with a wiring harness which is flexible and does not constrain the mounting location for the motors and motor position sensors inside the antenna.

An additional benefit of this design is that a customer does not need to perform a calibration step at installation. The position feedback sensors are installed and calibrated at the factory. Since there is never a mechanical separation in the phase shifter drive chain after the antenna leaves the factory, calibration is never lost. The present invention can be used for control of electro-mechanical actuators inside the antenna for purposes other than remote electrical beam tilt (RET.) Actuators for remote azimuth beam steering (RAS) and/or remote azimuth beam width control (RAB) can also be controlled using the same multi-device control unit.

Turning now to the figures, in which like element numerals refer to similar element throughout the figures, FIG. 1 is an electrical schematic of a prior art configuration for a tri-band antenna 4 with three removable RET actuators 5*a-c*. In this arrangement, there is a mechanical interface 7 forming a drive train linkage between the antenna 4 and the RET actuators 5*a-c*. The tri-band antenna 4 includes three self contained, separately removable RET actuators 5*a-c*, one for each antenna array implementing an operational frequency band of the antenna. Referring to the RET actuator 5*a* as a representative unit, the RET actuator is a self contained electro-mechanical device with lightning protection circuits 52*a* and 54*b*, a communications interface 56*a*, a position sensor interface 58*a*, a motor control interface 60*a*, a power control circuit 62*a*, a motor 64*a*, and a position sensor 66*a* contained within a single enclosure 67*a*. A drive rod 68*a* extending through the enclosure drives the phase shifters of an associated antenna array 70*a*. Therefore, the RET actuators 5*a-c* contain a complete duplication of the equipment needed to control the electrical tilt of an array transmitting and receiving the signals for one beam of a multi-beam antenna. In addition, the drive rods 68*a-c* must mechanically interface with the control rods of the antenna arrays 70*a-c*, resulting in a physically restrictive and potentially complicated mechanical interface 7.

Figure 2:
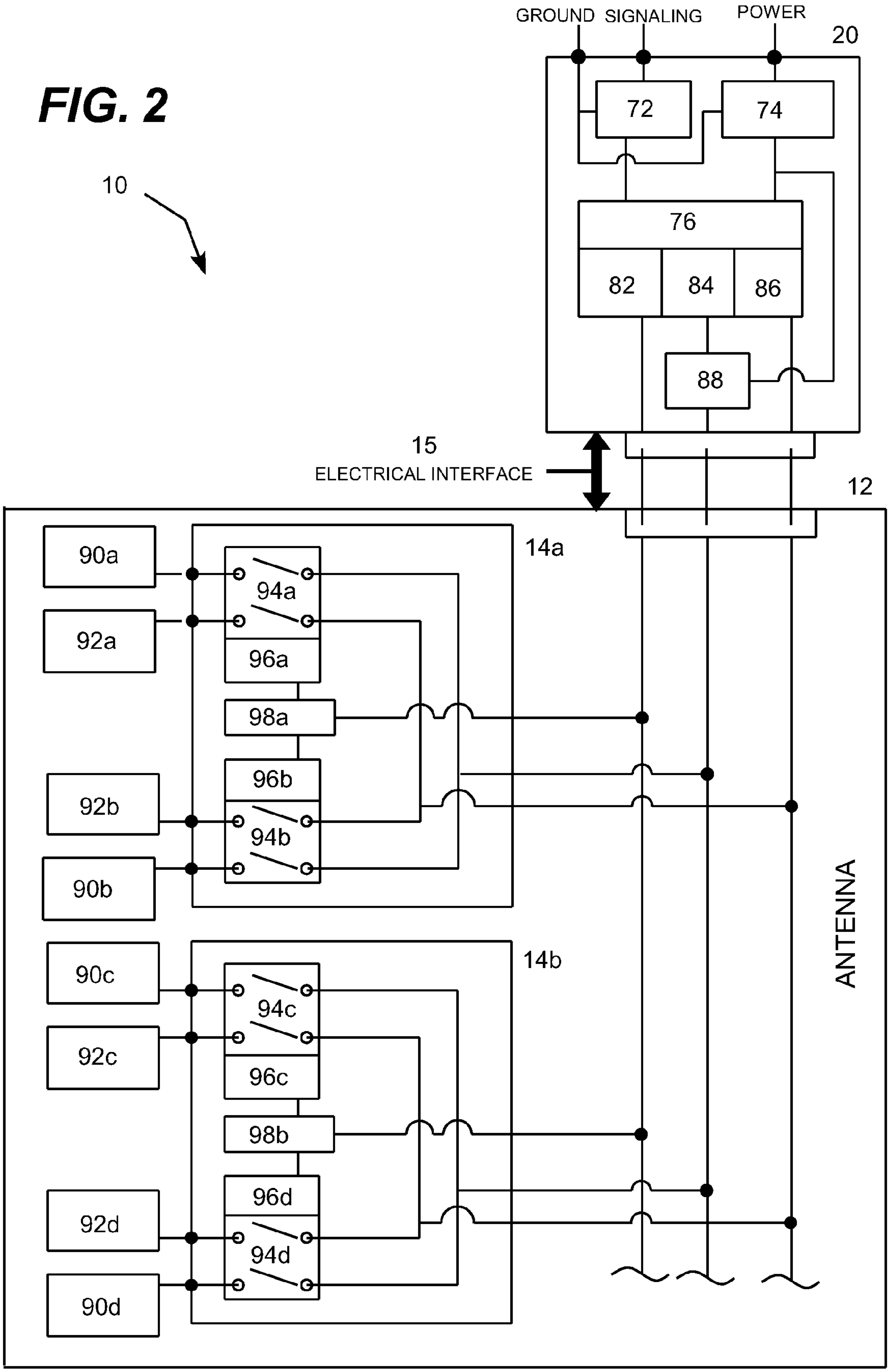
FIG. 2 is an electrical schematic of a tri-band RET antenna with a multi-device control unit and internal switching devices.

FIG. 2 is an electrical schematic of an antenna system 10 including a dual-polarization, tri-band RET antenna 12 and a multi-device control unit 20. The multi-device control unit 20 includes lightning protection circuits 72 and 74, a communications interface 76, an internal addressing interface 82, a motor control interface 84, a position sensing interface 86, and a power control circuit 88. The multi-device control unit 20 works together with modular switching devices 14*a-b*, which are typically located inside the antenna enclosure, to control the phase shifters to implement electrical beam tilt for up to four bands of a multi-band antenna. The multi-device control unit 20 and the modular switching devices 14*a-b* shown in FIG. 2 therefore replace up to four sets of components (i.e., those components in the multi-device control unit) in the prior art design shown in FIG. 1. The single set of components in the multi-device control unit 20 works in concert with the modular switching devices 14*a-b* to control the electrical tilt for all three beams of the antenna with the single set of control components in the multi-device control unit 20 with one of the four potential control circuits dormant in this particular configuration. It should be appreciated that the multi-device control unit 20 may be may be configured to control additional devices. For example, a typical control unit can support up to 16 motor/position sensors. Although FIG. 2 shows only two modular switching devices 14*a-b* eight modular switching devices are typically installed, and a larger or smaller number could be installed as a matter of design choice.

As each modular switching device 14*a-b* is identical, a representative modular switching device 14*a* will be described. The modular switching device, which is configured to relay tilt control commands from the multi-device control unit 20 for up to two operational bands implemented by antenna arrays, drives up to two existing internal phase shifter motors 90*a-b* and interfaces with up to two existing internal position sensors 92*a-b* of the host antenna. The modular switching device 14*a* itself includes switches 94*a-b*, fixed address registers 96*a-b*, and a comparator 98*a*. The comparator, which operates as a signal routing device to route control commands to the appropriate switch, could be replaced by functionality in or associated with the address registers or any other suitable signal routing device that directs addressed signals to an associated addressed device. However, it will be appreciated that with only two addresses to route, a simple comparator is adequate for the signal routing task in this particular embodiment. Control logic in the multi-device control unit 20 operates cooperatively with the fixed address registers 94*a-b* and the comparator 98*a* to selectively control the phase shifter motors 90*a-b*. As result, the multi-device control unit 20 can independently control up to four phase shifter motors through the pair of modular switching devices 14*a-b*. Of course, a greater or smaller number of phase shifter motors could be controlled at the particular antenna requires.

It should be appreciated that the RET motors and position sensors are the motors and position sensors originally provisioned in the antenna 12, which avoids the need for a mechanical linkage between the multi-device control unit 20 and the antenna 12. Therefore, there is only an electrical interface 15 is required between the multi-device control unit 20 and the antenna 12, as shown schematically in FIG. 2. If desired, the motors 90*a-b*, position sensors 92*a-b*, and switching devices 14*a-b* can be installed but remain dormant in the antenna 12 in the absence of the multi-device control unit 20. This allows the antenna 12 to be provisioned at the factory to be easily converted from manual tilt control to RET motorized tilt control through the addition of the multi-device control unit 20. Although the motors 90*a-b*, position sensors 92*a-b* and switching devices 14*a-b* are provisioned but left dormant in a manual tilt control antenna in this alternative, the cost of providing these components is more than offset by the benefit of eliminating the mechanical linkage and accompanying physical design constraints required to connect the prior art style RET actuator to the antenna.

The modular switching devices 14*a-b* and associates wiring are preferably located in strategic locations inside the antenna enclosure at the time of manufacture. Nevertheless, as an alternative arrangement, the multi-device control unit 20 may be installed at the factory as original equipment, and a module containing the switching devices 14*a-b* may fit into the receptacle. In this case, the switching module is provided to the customer upon request for the optional RET functionality. As another alternative, the multi-device control unit 20 and the modular switching devices 14*a-b* may be combined into an integrated control module that fits into the receptacle. In this case, the integrated control module is provided to the customer upon request for the optional RET functionality. As yet another alternative, the combined functionality of the multi-device control unit 20 and the modular switching devices 14*a-b* may be installed inside or in association with the antenna at the factory as original equipment, and an activation device or activation code may be provided to the customer upon request for the optional RET functionality.

The advantages of the present invention can be enhanced with additional motorized actuators, for example for beam azimuth steering and beam width control. In particular, the same size multi-device control unit 20 with additional switching devices located in strategic locations inside the antenna can control many motorized actuators to perform these and other antenna functions. Therefore, the multi-device control unit scheme can be extended to a wide range of motorized actuators performing a wide range of functions within the antenna without the physical limitations of mechanical linkages between the antenna and removable remote control actuators.

Figure 3:
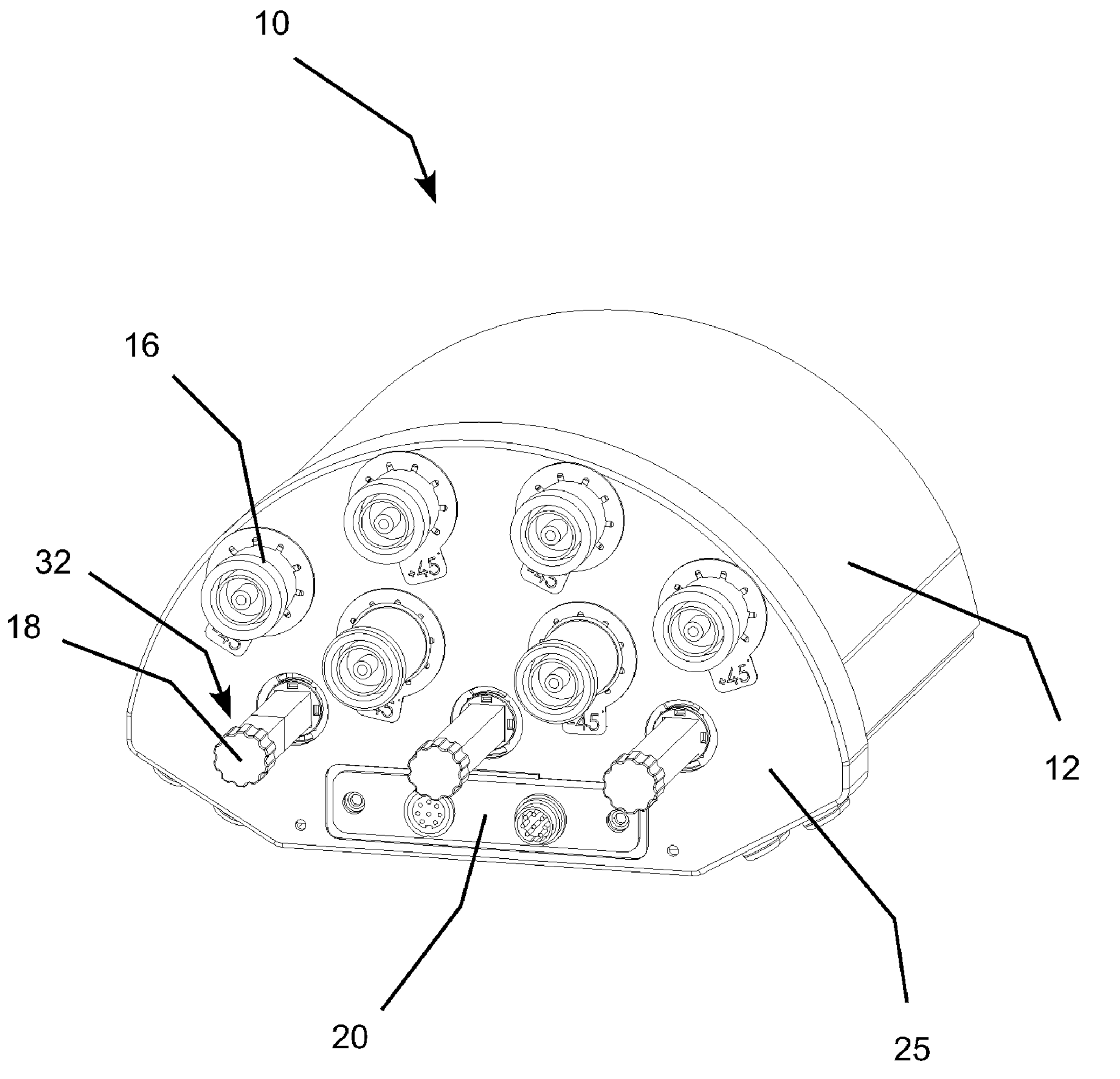
FIG. 3 is a perspective view of a tri-band RET antenna with a multi-device control unit.

FIG. 3 is a perspective view of the bottom portion of the antenna system 10 including the tri-band antenna 12 shown substantially to scale. For this particular antenna, the maximum width across the bottom of the antenna enclosure 25 is approximately 10 inches (24.5 cm) and the maximum depth across the bottom of the antenna enclosure is approximately 6 inches (14.2 cm). The height of the antenna is not shown and can vary considerably for different embodiments. For example, a typical tri-band antenna 12 may be approximately 8 feet 10 inches (2.7 meters) tall. The bottom of the enclosure 25 carries six cable connectors represented by the enumerated cable connector 16. Each vertical array transmits and receives one band of the tri-band antenna, and each band has two cable connectors, one for each polarization. Also at the bottom of the enclosure, there are three manual beam tilt adjusters (including a beam tilt indicator displayed on the bottom portion of a phase shifter control rod, a manual beam tilt adjustment knob connected to the bottom of the phase shifter control rod, and an indicator cover) represented by the enumerated manual beam tilt adjuster 32 with a manual adjustment knob 18 the end. The antenna system 10 also includes the multi-device control unit 20, which fits into a receptacle 22 (shown in FIGS. 4-7) in the antenna housing on the bottom of the enclosure 25.

Figure 4:
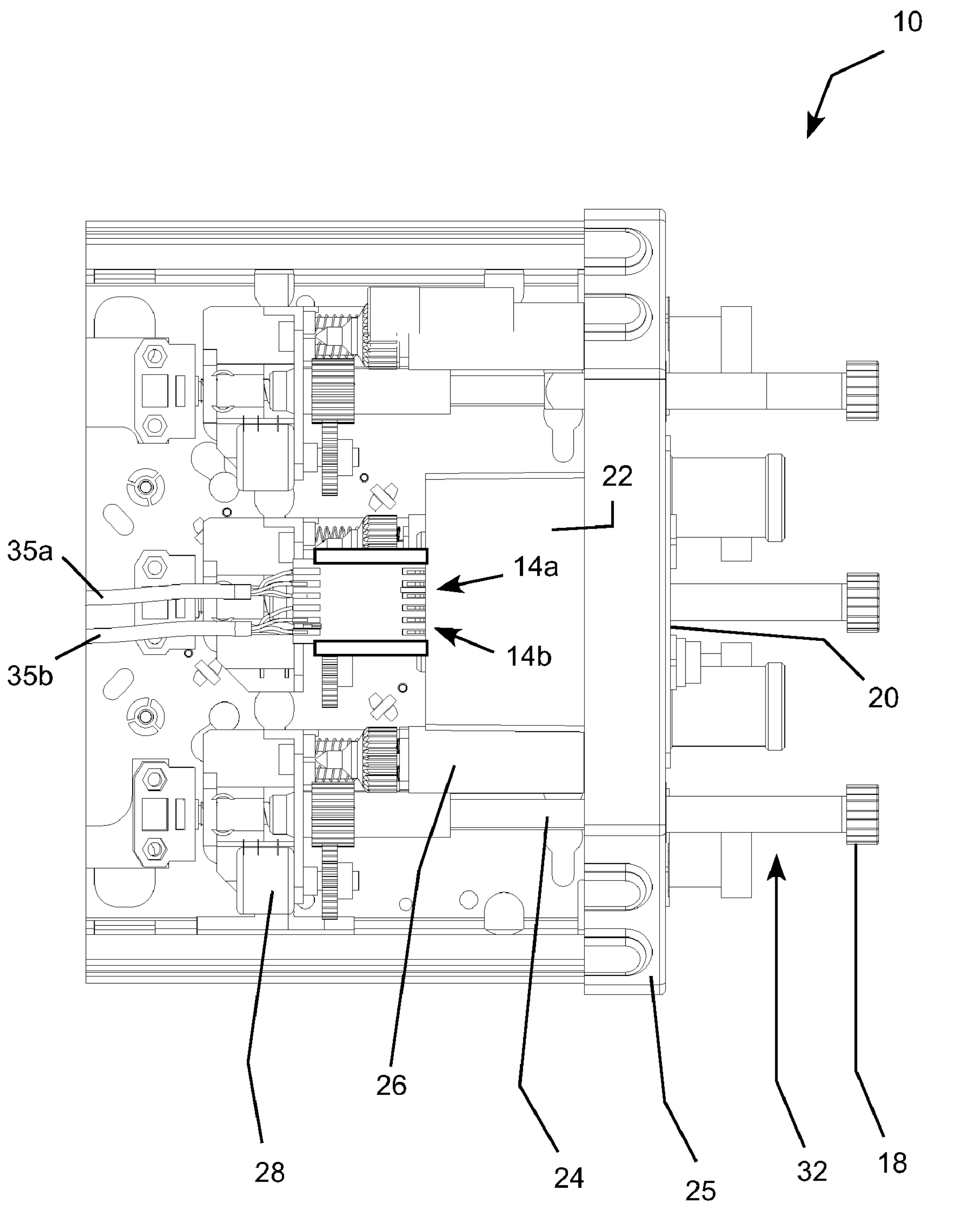
FIG. 4 is a front view of the RET control equipment in an RET antenna with a multi-device control unit.

FIG. 4 is a front view of the RET control equipment in the antenna 12. There are three phase shifter control rods represented by the phase shifter control rod 24, three gear-motor units represented by the gear-motor unit 26, and three position sensors represented by the enumerated position sensor 28. A receptacle 22 receives the multi-device control unit 20, physically supports and electrically connects to the switching devices 14*a*-*b*, which are implemented on PC cards. The switching devices 14*a*-*b* are electrically connected by wires 35*a*-*b* that go to the gear motors and positions sensors, as shown in FIG. 4 and schematically in FIG. 2.

Figure 5:
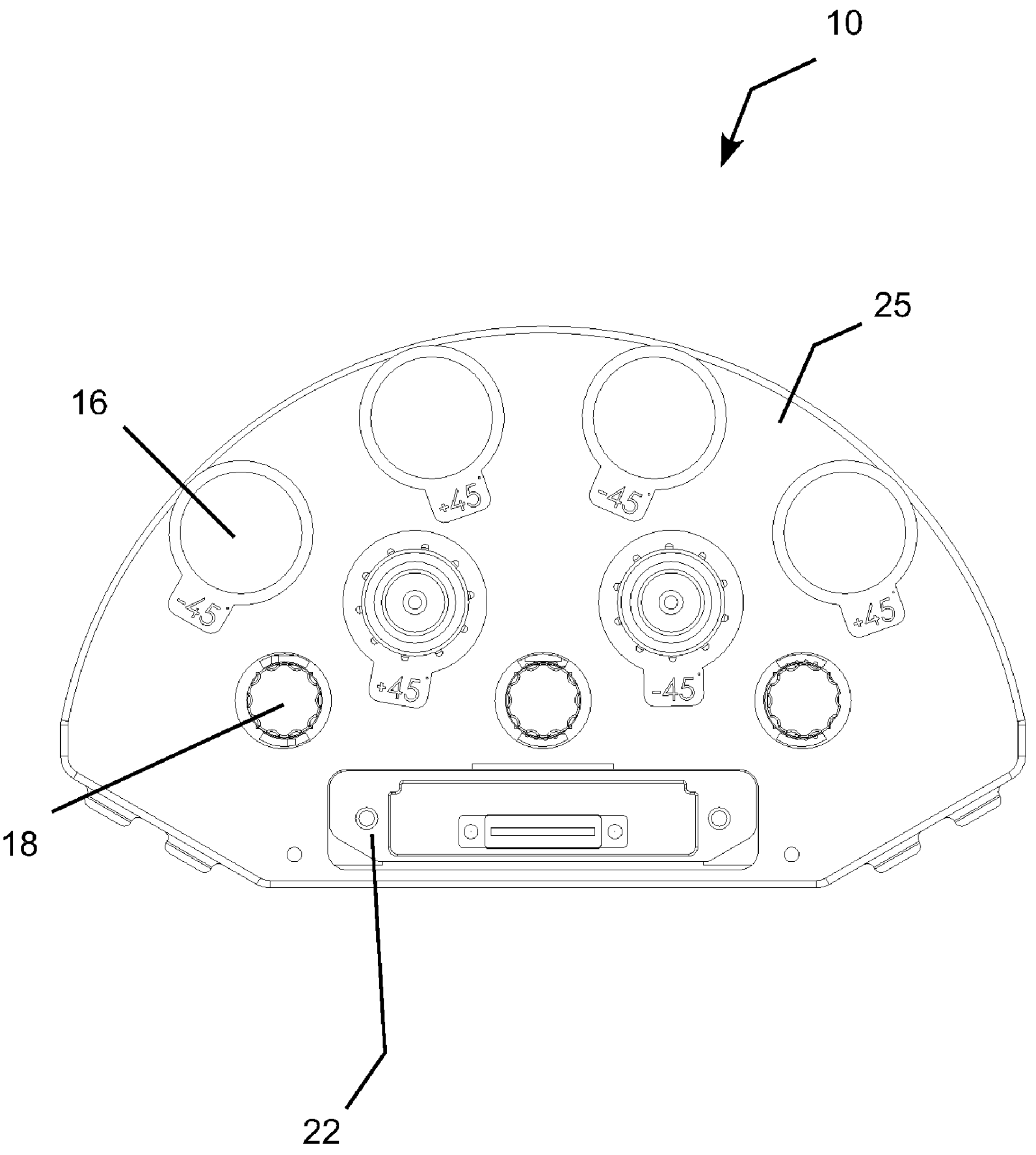
FIG. 5 is a bottom view of the antenna enclosure of an RET antenna with a multi-device control unit.
Figure 6:
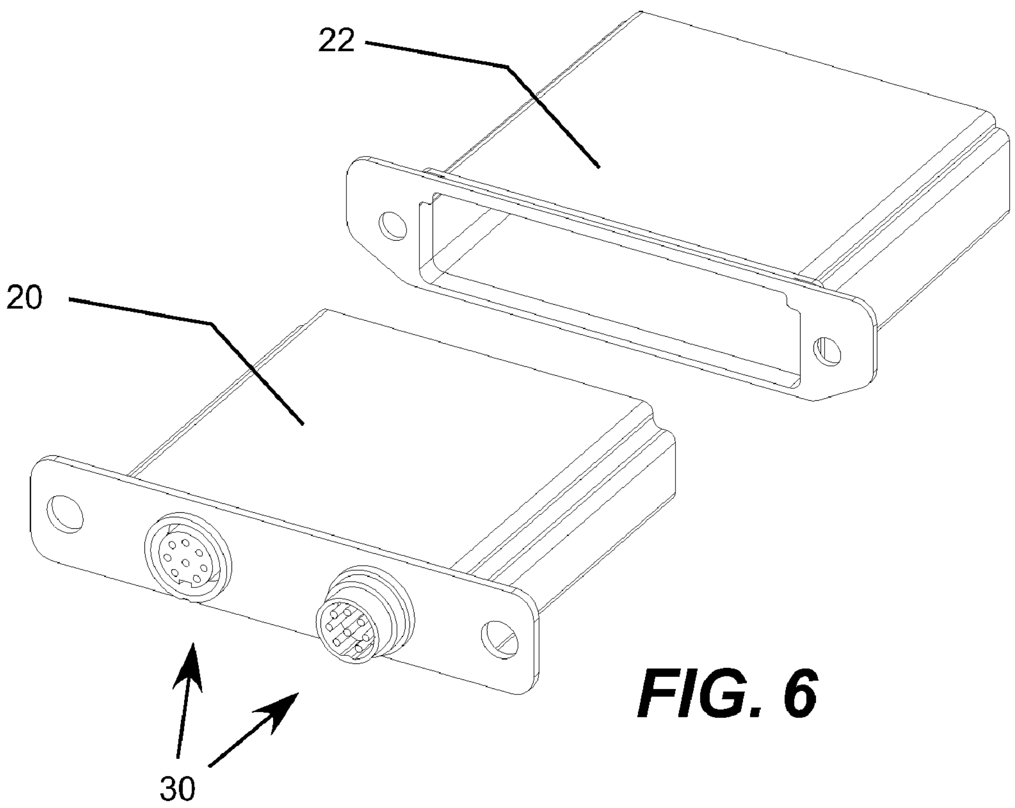
FIG. 6 is a front perspective view of a multi-device control unit and associated receptacle.
Figure 7:
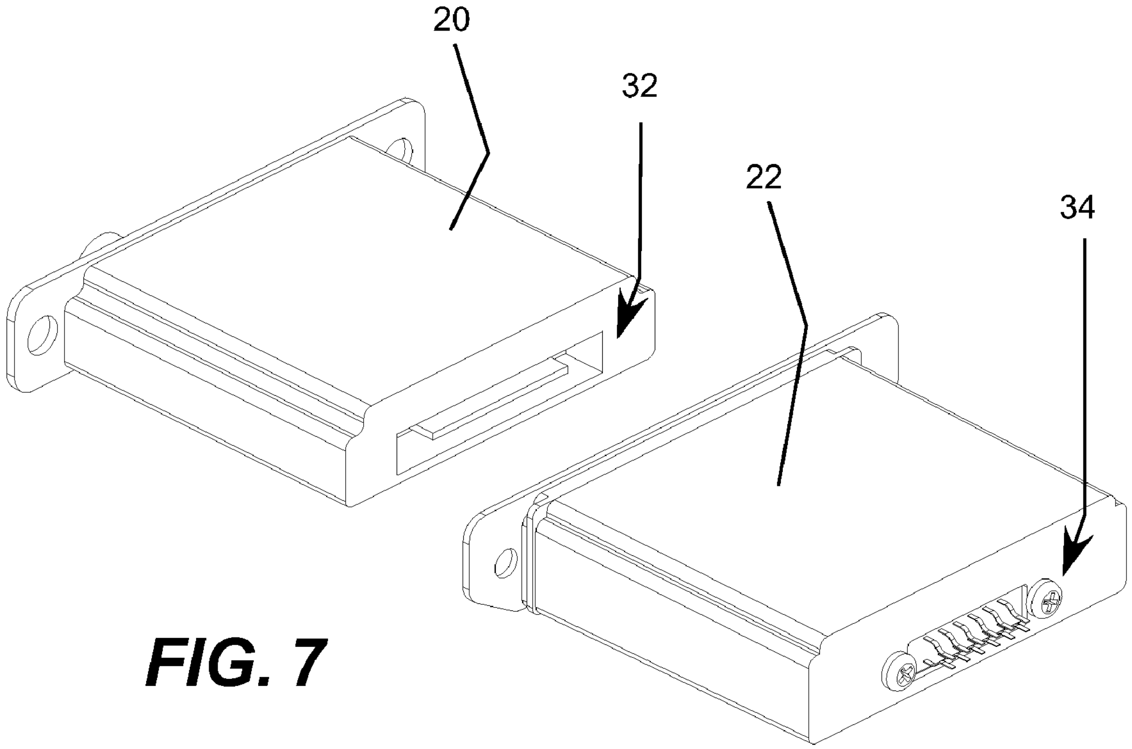
FIG. 7 is a rear perspective view of the multi-device control unit and associated receptacle.

FIG. 5 is a bottom view of the antenna enclosure 25 of an RET antenna 12. The enclosure 25 carries the receptacle 22 (shown without the multi-device control unit in FIG. 5) for receiving the multi-device control unit 20, which plugs into receptacle and is secured by two screws. FIG. 6 is a front perspective view and FIG. 7 is a rear perspective view of the multi-device control unit 20 and the associated receptacle 22. The front of the multi-device control unit 20 includes cable connectors 30 for connecting the multi-device control unit to a remote control unit. The rear of the multi-device control unit includes a plug 32, such as a PC board edge connector, that plugs into a connector 34 on the receptacle 22. The switching devices 14*a*-*b* plug onto the connector 34 and, in turn, are connected by wire to the gear-motors and position sensors located inside the antenna, as shown in FIG. 4.

The invention claimed is:

1. A base station antenna for a telecommunications system comprising:

a plurality of beam systems supported by an antenna housing, each beam system comprising a plurality of antenna elements for directing a beam of electromagnetic energy in a propagation direction, a plurality of phase shifters operatively connected to the antenna elements for tilting the beam propagation direction, a control device operatively connected to the phase shifters for operating the phase shifters to tilt the beam propagation direction, and a gear-motor unit operatively connected to the control device for electro-mechanically driving the control device to tilt the beam propagation direction;

a multi-device control unit operative to selectively control the beam propagation direction of each beam system; and at least one modular switching device configured to interface between the multi-device control unit and the motors and position sensors of the antenna systems to allow a single set of control electronics of the multi-device control unit to selectively control the beam propagation direction of each beam system.

2. The antenna of claim 1, wherein the multi-device control is configured for manual insertion into and removal from a receptacle supported by the housing.

3. The antenna of claim 1, wherein the modular switching device unit is located inside the enclosure.

4. The antenna of claim 1, wherein the multi-device control unit comprises a lightning protection circuit, a communications interface, an internal addressing interface, a motor control interface, a power sensing interface, and a power control circuit.

5. The antenna of claim 1, wherein the modular switching device comprises at least one switch, a signal routing device, and a plurality of address registers, each register associated with a beam system of the antenna.

6. A base station antenna for a telecommunications system comprising:

a plurality of beam systems supported by an antenna housing, each beam system comprising a plurality of antenna elements for directing a beam of electromagnetic energy in a propagation direction, a plurality of phase shifters operatively connected to the antenna elements for tilting the beam propagation direction, a control device operatively connected to the phase shifters for operating the phase shifters to tilt the beam propagation direction, and a gear-motor unit operatively connected to the control device for electro-mechanically driving the control device to tilt the beam propagation direction;

a receptacle supported by the housing;

a multi-device control unit configured for manual insertion into and removal from the receptacle operative to selectively control the beam propagation direction of each beam system; and at least one modular switching device operable to interface between the multi-device control unit and the motors and position sensors of the antenna systems to allow a single set of control electronics of the multi-device control unit to selectively control the beam propagation direction of each beam system.

7. The antenna of claim 6, wherein the multi-device control unit consists essentially of a lightning protection circuit, a communications interface, an internal addressing interface, a motor control interface, a power sensing interface, and a power control circuit.

8. The antenna of claim 7, wherein the modular switching device consists essentially of one or more switches, a signal routing device, and a plurality of address registers, each register associated with a beam system of the antenna.

9. A method for providing a base station antenna for a telecommunications system with optional multi-beam RET control functionality, comprising the steps of:

providing an antenna operator with an antenna comprising a plurality of beam systems supported by an antenna housing, each beam system comprising a plurality of antenna elements for directing a beam of electromagnetic energy in a propagation direction, a plurality of phase shifters operatively connected to the antenna elements for tilting the beam propagation direction, a control device operatively connected to the phase shifters for operating the phase shifters to tilt the beam propagation direction, and a gear-motor unit operatively connected to the control device for electro-mechanically driving the control device to tilt the beam propagation direction;

provisioning the antenna prior to delivery to the antenna operator with a receptacle supported by the housing;

provisioning the antenna prior to delivery to the antenna operator with a switching device operable to interface between a multi-device control unit and the motors and position sensors of the antenna systems to allow a single set of control electronics of the multi-device control unit to selectively control the beam propagation direction of each beam system; and in response to a request from the antenna operator for optional multi-beam RET control functionality received after initial delivery of the antenna, providing the antenna operator with the multi-device control unit.

10. The method of claim 9, wherein the multi-beam RET control consists essentially of a lightning protection circuit, a communications interface, an internal addressing interface, a motor control interface, a power sensing interface, and a power control circuit.

11. The antenna of claim 10, wherein the modular switching device consists essentially of one or more switches, a signal routing device, and a plurality of address registers, each register associated with a beam system of the antenna.

* * * * *